United States Patent [19]

Inagaki

[11] Patent Number: 5,043,061
[45] Date of Patent: Aug. 27, 1991

[54] EVAPORATION AND EMANATION TYPE WASTEWATER TREATING APPARATUS

[76] Inventor: Jitsuo Inagaki, 71 Aza Kamiyashiki, Oaza Itsusiki, Itsusikicho Hazugun, Aichi, Japan

[21] Appl. No.: 444,715

[22] Filed: Dec. 1, 1989

[51] Int. Cl.$^5$ .............................................. C02F 1/04
[52] U.S. Cl. .................... 210/151; 210/170; 210/180; 210/188; 210/202; 210/295; 159/905; 159/906; 159/DIG. 28
[58] Field of Search .............. 210/151, 170, 202, 259, 210/747, 916, 188, 295, 180, 182; 159/905, 906, DIG. 28

[56] References Cited

U.S. PATENT DOCUMENTS

| | | | |
|---|---|---|---|
| 3,770,623 | 11/1973 | Seidel | 210/170 |
| 3,907,679 | 9/1975 | Yost | 159/905 |
| 3,925,206 | 12/1975 | Den | 210/170 |
| 4,039,451 | 8/1977 | Smith | 210/170 |
| 4,162,976 | 7/1979 | Monson | 210/170 |
| 4,218,318 | 8/1980 | Nimi et al. | 210/170 |
| 4,333,831 | 6/1982 | Petzinger | 210/170 |
| 4,839,051 | 6/1989 | Higu | 210/170 |
| 4,855,040 | 8/1989 | Kickuth | 210/170 |
| 4,882,071 | 11/1989 | Bench et al. | 210/747 |

Primary Examiner—Stanley Silverman
Assistant Examiner—Christopher Upton
Attorney, Agent, or Firm—Donald W Hanson

[57] ABSTRACT

Apparatus for treating living wastewater which purifies water to be treated such as living miscellaneous wastewater in general homes, human waste, urban drains and the like to evaporate and emanate the treated water into the atmosphere.

The apparatus comprises a treating vessel for treating wastewater which is water to be treated, a sludge separating sediment layer filled into said treating vessel, a wastewater introducing pipe for introducing wastewater into said treating vessel, and a capillary suction type evaporation and emanation unit for evaporating and emanating the treated water into the atmosphere.

13 Claims, 10 Drawing Sheets

EVAPORATION AND EMANATION TYPE WASTEWATER TREATING APPARATUS

BACKGROUND OF THE INVENTION

This invention relates to an apparatus for treating living wastewater which purifies water to be treated such as living miscellaneous wastewater in general homes, human waste, urban drains and the like to evaporate and emanate the treated water into the atmosphere.

Figure 10:
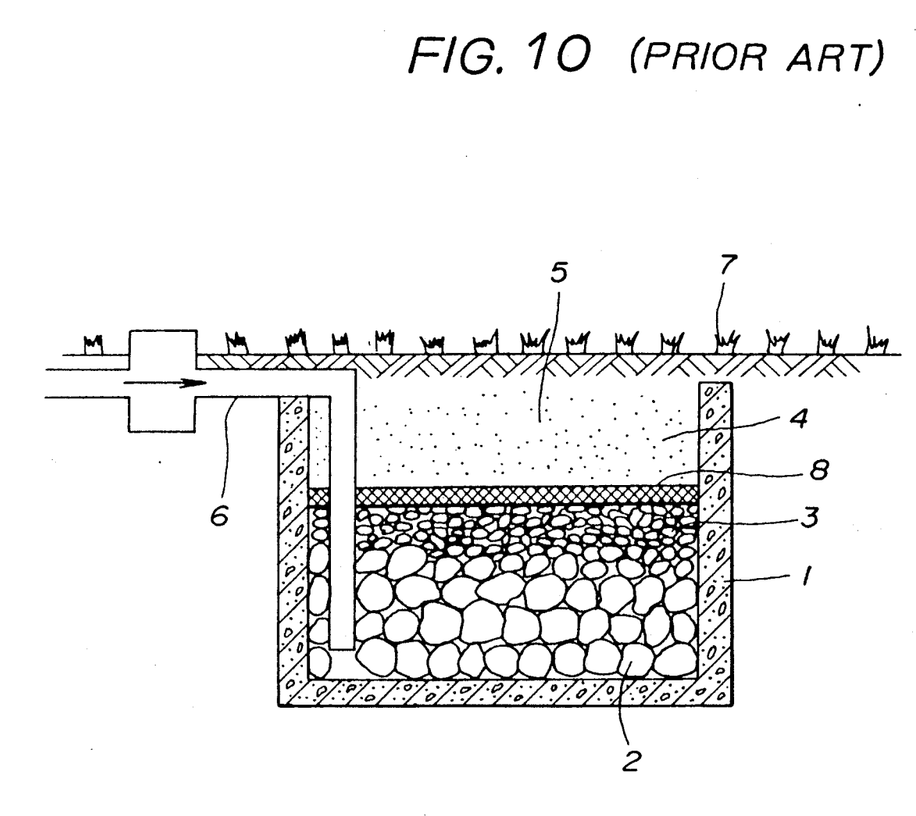
FIG. 10 is a sectional view of a conventional treating vessel.

As a combined sewage purifier for purifying water to be treated such as living miscellaneous wastewater, urban drains and the like, an evaporation and emanation type wastewater treating apparatus has been used. A conventional evaporation and emanation type wastewater treating apparatus heretofore known is designed as shown in FIG. 10 where cobble stones 2, gravel 3 and sand 4 are layered in that order within a concrete treating vessel 1, a sediment layer such as soil 5 is laminated on the upper surface of the sand 4 through a Saran netting 8, a wastewater introducing pipe 6 is disposed so that the extreme end thereof reaches the bottom of the treating vessel, and a plant 7 for evaporating and emanating the treated water to the ground surface is planted.

In this apparatus, as a water level rises, the waste water introduced into the bottom of the treating vessel by passing through the wastewater introducing pipe 6 successively permeates into the cobble stones 2, gravel 3, sand 4 and soil 5, the water is treated and purified in the course that the wastewater is moved upward by the capillary action, and when approaching the ground surface, the water is absorbed by the roots of grasses and trees, and the wastewater is evaporated and emanated from pores of the plants due to plant photosynthesis and adjustment of temperature. A part of the wastewater evaporates and emanates also from the ground surface. An organic material decomposer such as bacteria which decomposes an organic material to change it into a water soluble material which can be easily absorbed by the roots as nutriments is present whereby an organic residue or mineral (inorganic material) are treated.

However, the above-described conventional natural evaporation and emanation system involves an important problem in that the evaporation and emanation power and decomposition power are affected by natural conditions. For example, the trees, grasss or the like enter a repose period in a winter season where their pores are closed and as a result, the metabolic activity stops. Therefore, the evaporation and emanation through the plant stops, and the activity of the organic material decomposer such as bacteria in the vicinity of the root is also reduced, and the decomposition of the residual organic material is delayed. A further problem is posed in that a portion directly evaporated and emanated from the ground surface is formed into a frozen soil due to insufficient supply of evaporation latent heat or into a state under snow, thus lowering the evaporation power of the ground surface. This trend comprises a problem inherently occuring as natural conditions in areas other than the tropics to one degree or another.

SUMMARY OF THE INVENTION

It is an object of this invention to provide an evaporation and emanation type living wastewater treating apparatus which prevents the evaporation and emanation type living wastewater treating power from being lowered in the winter season and is provided with a uniform evaporation and emanation power during the year.

It is a further object of this invention to provide an evaporation and emanation type living wastewater treating apparatus in which even if water to be treated emits odor, the odor is prevented from being scattered into the atmosphere.

Other objects and advantages of the invention will become apparent from the ensuing description with reference to the accompanying drawings.

DETAILED DESCRIPTION OF THE PREFERRED EMBODIMENTS OF THE INVENTION

The structure of the present invention for achieving the aforesaid objects is characterized by comprising a treating vessel for treating wastewater as a water to be treated, a sludge separating sediment layer filled into said water treating vessel, a wastewater introducing pipe for introducing wastewater into said treating vessel, and a capillary suction type evaporation and emanation unit for evaporating and emanating the treated water into atmosphere.

An embodiment of the present invention will be described hereinafter with reference to the drawings.

Figure 1:
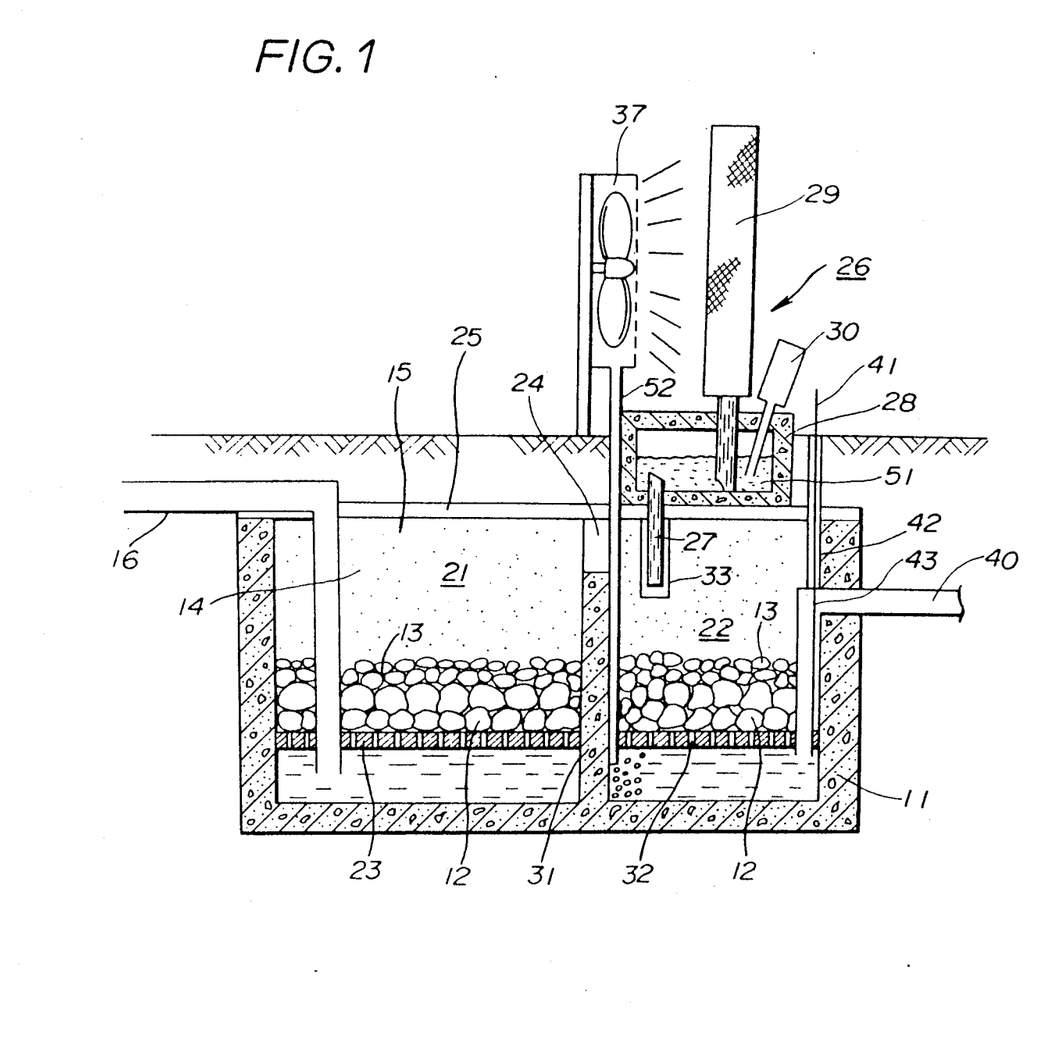
FIG. 1 is a sectional view showing an embodiment of the present invention.
Figure 2:
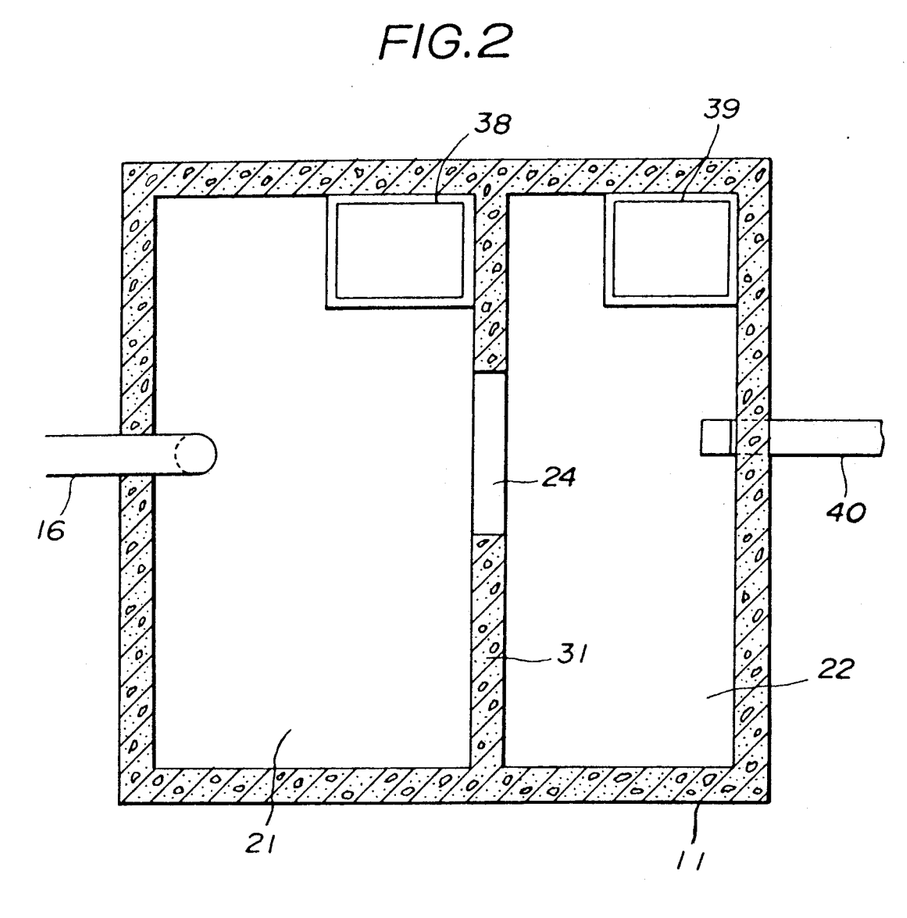
FIG. 2 is the top view of a treating vessel of the present invention shown in FIG. 1.

FIG. 1 is a schematic sectional view showing an embodiment of the present invention and FIG. 2 is a top view thereof.

A treating vessel 11 for treating wastewater is divided by a partitioning wall 31 into two chambers, one being a primary treating vessel 21 and the other being a secondary treating vessel 22. The treating vessels are each interiorly provided with a plate body 23 secured at the lower portion of the vessel and formed with a number of openings 32, on which is formed a gravel layers having relatively small stones 12, gravel 13, sand 14 and soil 15 layered or laminated in that order. A wastewater introducing pipe 16 is disposed in the primary treating vessel 21 so that living wastewater as water to be treated is introduced into the bottom of the treating vessel passing through the waterwater introducing pipe 16, the wastewater being subjected to primary purification as the water level rises, after which it flows into the secondary treating vessel 22 from a concave overflow groove 24 formed in the upper end of the partitioning wall.

A capillary suction type evaporation and emanation unit 26 is placed on the upper end of the secondary treating vessel through a cover plate 25 for covering the treating vessel.

The capillary suction type evaporation and emanation unit 26 comprises a siphon type capillary suction pipe 27 pumping up water to be treated, a reservoir 28 for receiving the pumped up treated water, an evaporation and emanation panel 29 disposed in the reservoir 28 and a chemical liquid dropping bottle 30. The siphon type capillary suction pipe 27 extends through the cover plate and reservoir 28 from the interior of the treating vessel and is positioned within the reservoir 28 and is in contact with a water absorptive material 5 like a felt provided interiorly of the reservoir 28. Reference numeral 33 denotes an introducing guide pipe of the capillary suction pipe 27.

Figure 3:
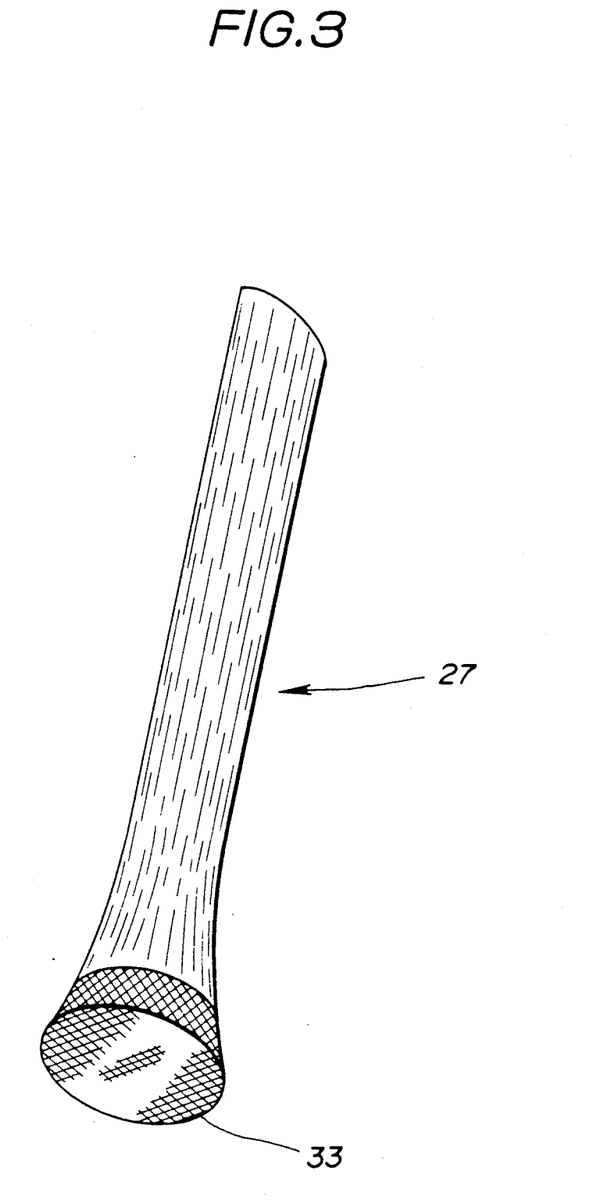
FIG. 3 is a perspective view of a capillary suction pipe.

The capillary suction pipe 27 is formed into a rodlike configuration, as shown in FIG. 3, to which is mounted at the lower end a dust collecting net-like member 33. The capillary suction pipe 27 is in the form of a bundle of water-proof and anticorrosive fibers of high molecular material such as polyethylene, polypropylene or the like so as to bear the capillarity. For example, fibers having a diameter of about 1 mm or hollow tubular fibers having a diameter of 0.2 mm or less may be molded into a bundle.

The treated water pumped up due to the capillarity by the capillary suction pipe 27 is absorbed by the water absorptive material 51 such as a felt. At this time, in case where some odor or organic material remains, chemical liquid having odor-proof and orgnic material decomposition power may be added to the water absorptive material 51 from the chemical liquid dropping bottle 30. Such a chemical liquid is preferably an acid additive obtained by dissolving vermicurite, which results from weathering of mica group mineral, into inorganic acid such as hydrochloric acid and sulfuric acid. This acid addive is obtained by mixing vermicurite and dilute hydrochloric acid obtained by diluting concentrated hydrochloric acid into concentration of $\frac{1}{2}$ to $\frac{1}{4}$ in the same part by weight under agitation, reacting for one week while agitating them at 20° to 30° C., and thereafter filtering. This additive is added to the treated liquid to thereby decompose odor, to remove the odor and separate the organic material.

The thus treated water moved upward toward the evaporation and emanation panel 29 due to the capillarity to evaporate and emanate from the panel 29.

Figure 4:
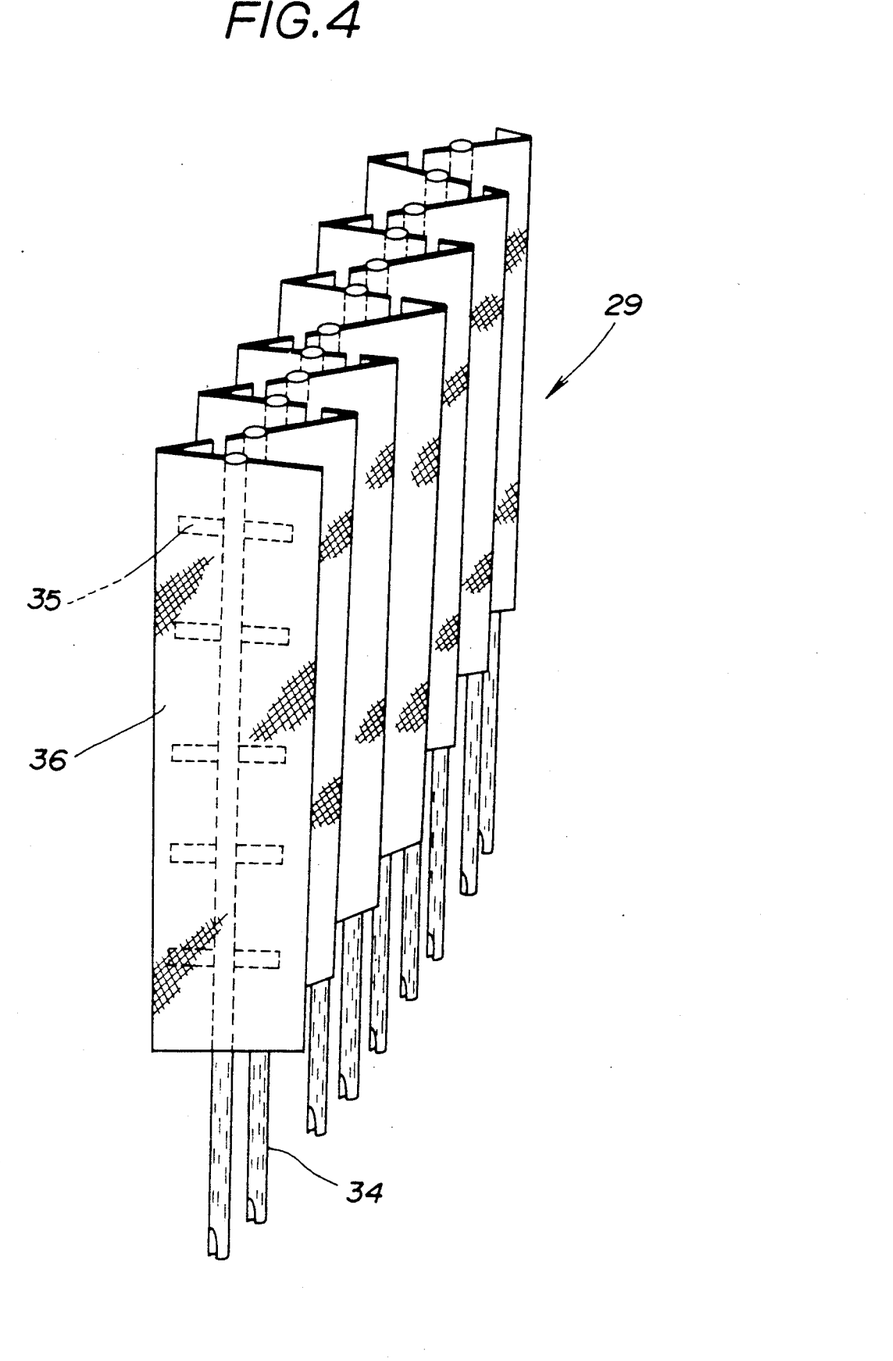
FIG. 4 is a sectional view of an evaporation and emanation panel of the present invention.

The evaporation and emanation panel 29 is composed of a capillary action portion having a number of rod-like members 35 horizontally laterally disposed on a rod-like member 34 and an evaporation plate 36 extended over the capillary action portion, as shown in FIG. 4. The capillary action portion is constructed such that a bundle of fibers bearing the capillarity is accommodated in a porous insulator or a porous metal pipe such as a porous ceramics pipe or a porous SUS pipe. The evaporation plate 36 may be formed of non-woven fabrics formed of SUS, resin or the like. The treated liquid moves from the capillary action portion to the evaporation plate 36 due to the capillary action and evaporates and emanates into the atmosphere. For prevention of clogging of the capillary action portion, an organic material viscosity lowering agent, for example, a surfactant, sodium hydroxide, weak alkaline material, etc. may be added into the treated liquid from the bottle 30.

The siphon type capillary suction pipe may be periodically reproduced and washed by raising and forced backflow to prevent the function from being lowered due to clogging.

For further sufficiently exhibiting the function of the present invention, a solar battery operated blower 37 is provided opposed to the evaporation plate 36 to assist ventilation of the surface of the evaporation plate and particularly to prevent freezing of the surface of the evaporation plate 36 in a winter season in cold area. Further, a heater is mounted on the surface 36 of the evaporation plate so that the plate may be heated as necessary.

While in the above-described embodiment, the treating vessel 11 has been divided into two chambers, the primary and secondary treating vessels 21 and 22, it is to be noted that this is not always necessary. However, doing so, it is convenient because anaerobic bacteria is added to the primary treating vessel 21 and aerobic bacteria is added to the secondary treating vessel 22 so that the liquid to be treated can be treated by different bacteria. In this case, while air needs be introduced into the secondary treating vessel 22, it is noted in the above-described embodiment air is introduced from the blower 37 through a pipe 52. In the winter season, an improved bacteria of which activity is not much lowered even in a cold season may be added for maintaining the activity thereof. The sludge produced by purifying the liquid to be treated is removed from openings of square tubular members 38 and 39 disposed in the primary and secondary treating vessels 21 and 22 with the lower ends thereof extended through the plate 23.

In case of reuse of the treated water by sprinkling it over the plant, the treated water can be carried to the site of use through a pipe 40 disposed within the secondary treating vessel 22. In this case, in the embodiment shown in FIGS. 1 and 2, an operating rod 41 loosely fitted in a guide pipe 42 may be moved up and down to open and close a valve 43.

Figure 5:
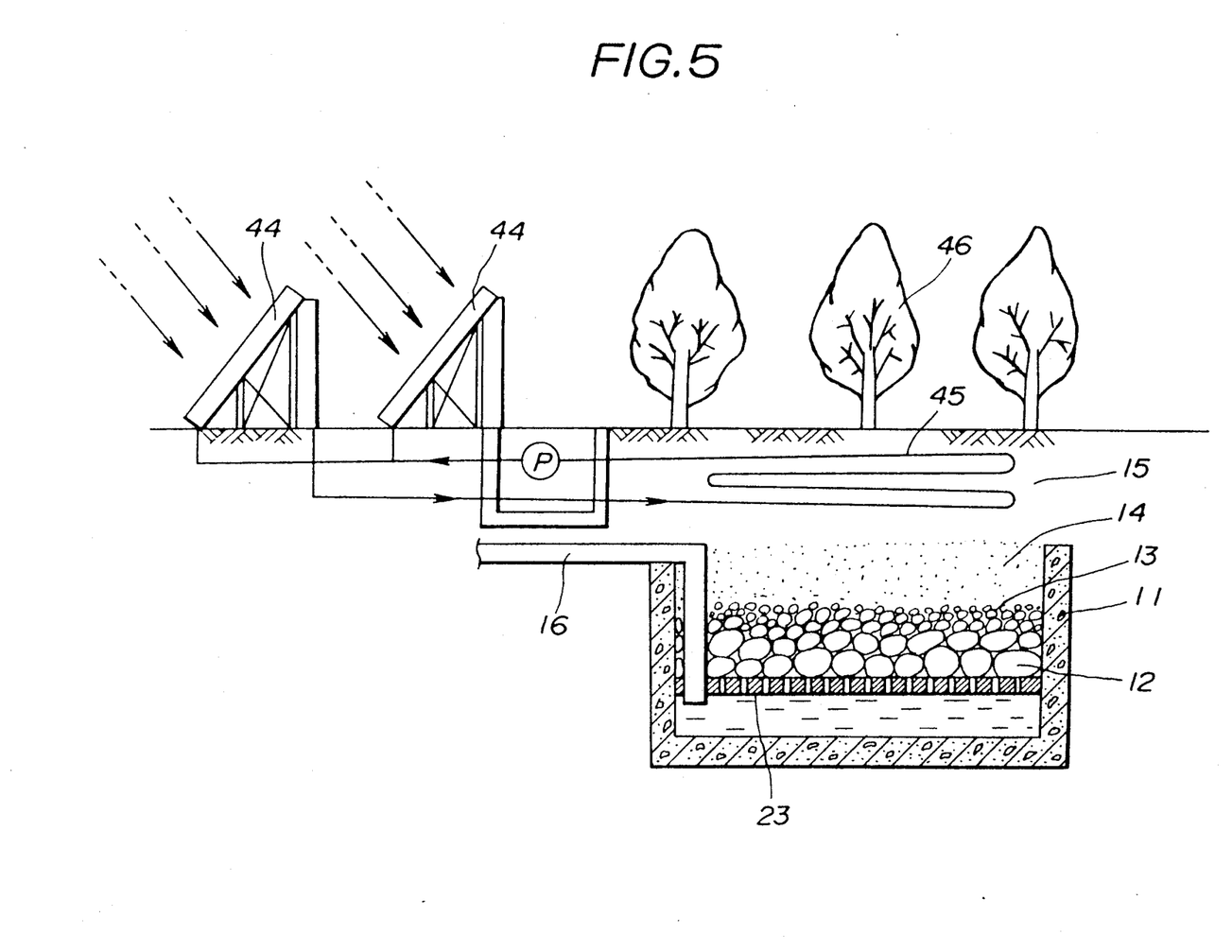
FIGS. 5 to 9 are respectively sectional views showing another embodiments of the present inventioon.

FIG. 5 shows another embodiment of the present invention, in which in the conventional natural evaporation and emanation system, a heat medium (such as an anti-freeze) is heated by heat collected by a solar heat collector 44 and the heated medium is circulated to heat the soil in the vicinity of the evaporation and emanation surface. In this case, if the capillary suction type evaporation and emanation unit 26 shown in FIGS. 1 and 2 is jointly used, a geometrical effect is obtained.

Figure 6:
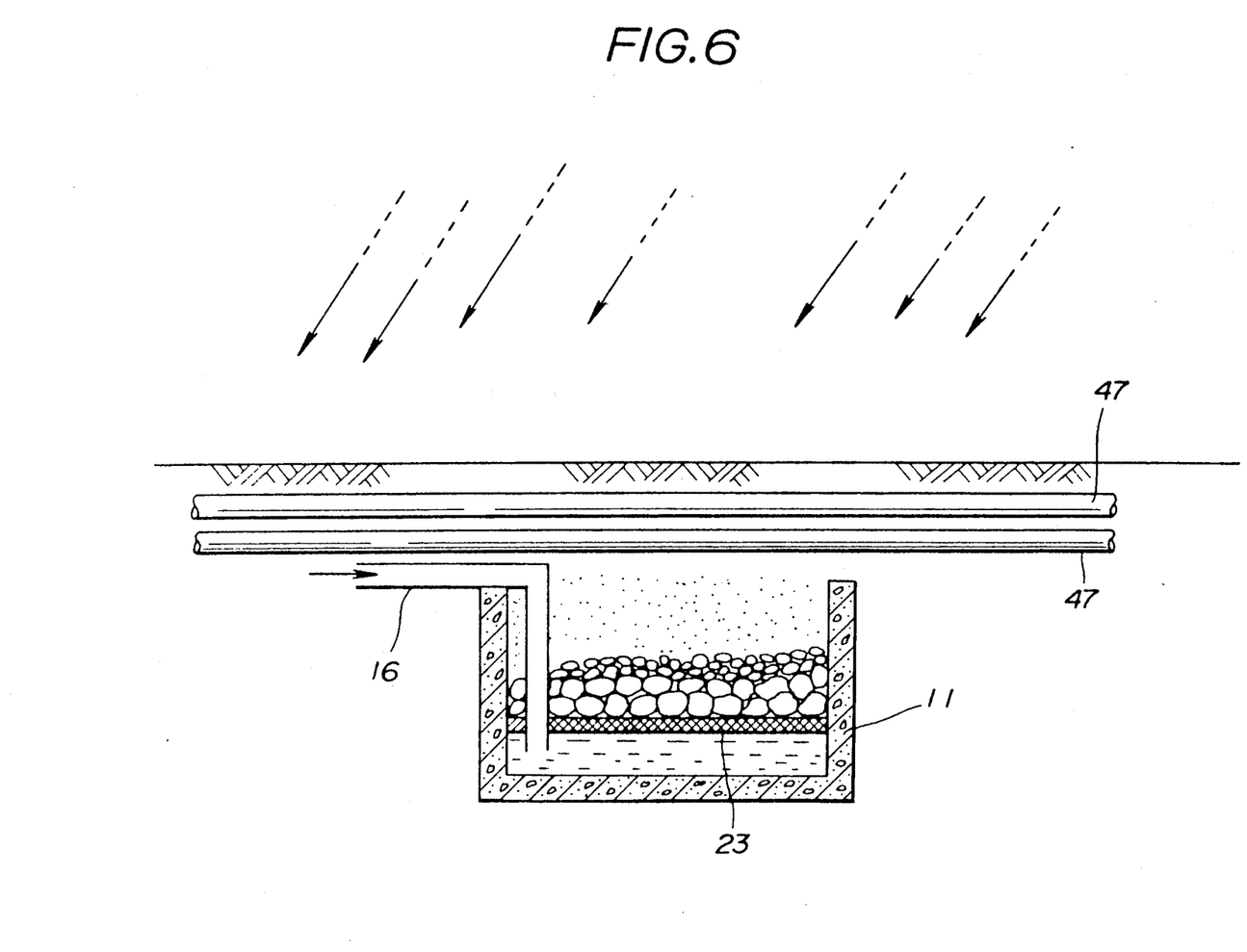
Figure 7:
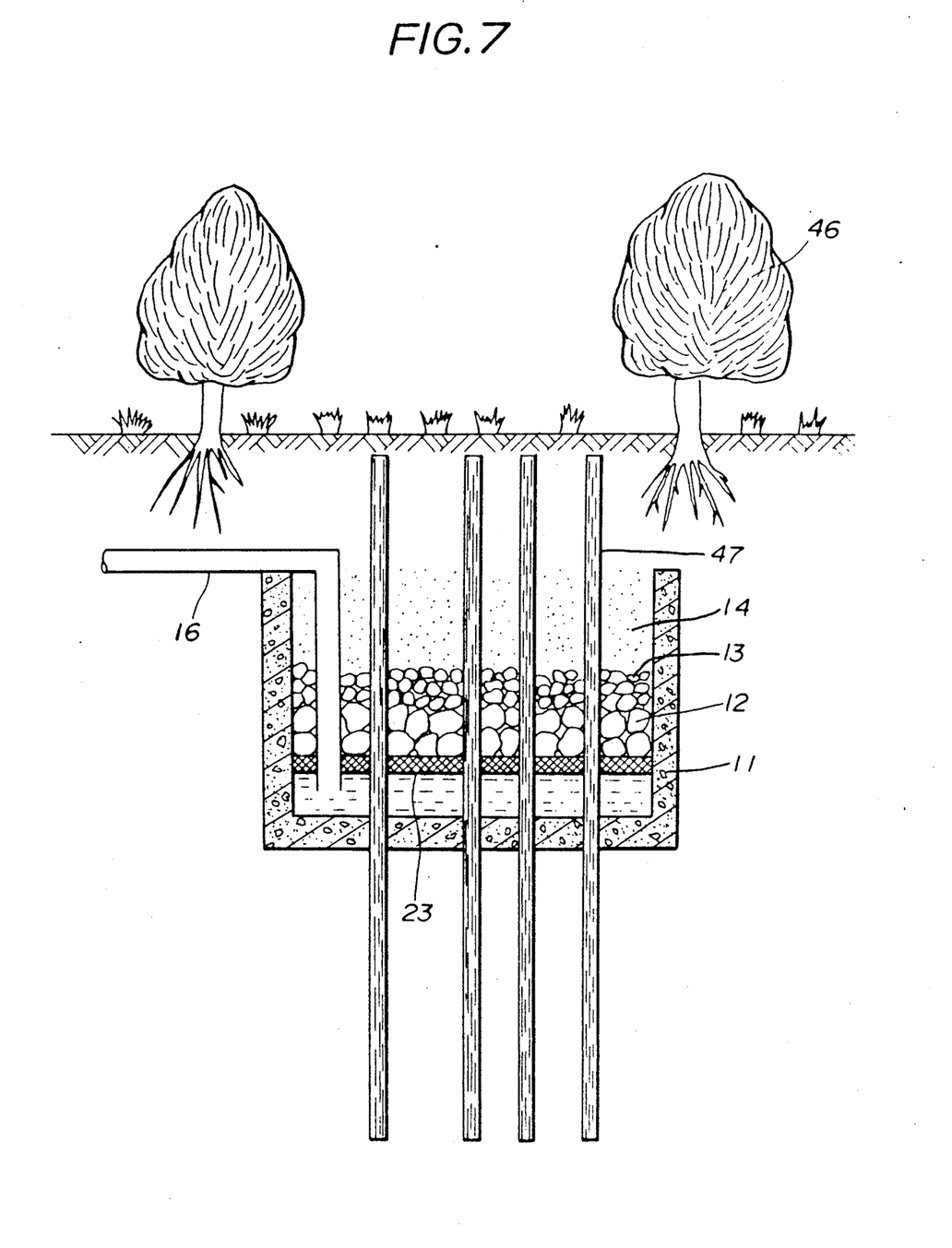

To heat the soil in the vicinity of the evaporation and emanation surface, as shown in FIG. 6, a heat pipe 47 with water sealed and the interior reduced in pressure is embedded into the soil, and solar energy of the ground surface is collected by said heat pipe. Alternatively, as shown in FIG. 7, the heat pipe 47 is made to extend through the treating vessel 11 and stood upright so that underground heat is sucked from the underground by the heat pipe 47 to promote the activation of organic decomposed bacteria to heat the ground surface and promote evaporation and emanation in a winter season which lowers the evaporation and emanation. Furthermore, the treating vessel itself may be heated to promote the activity of the organic decomposed bacteria, and the evaporation and emanation in the winter season may be promoted by the resultant generation of heat.

Figure 8:
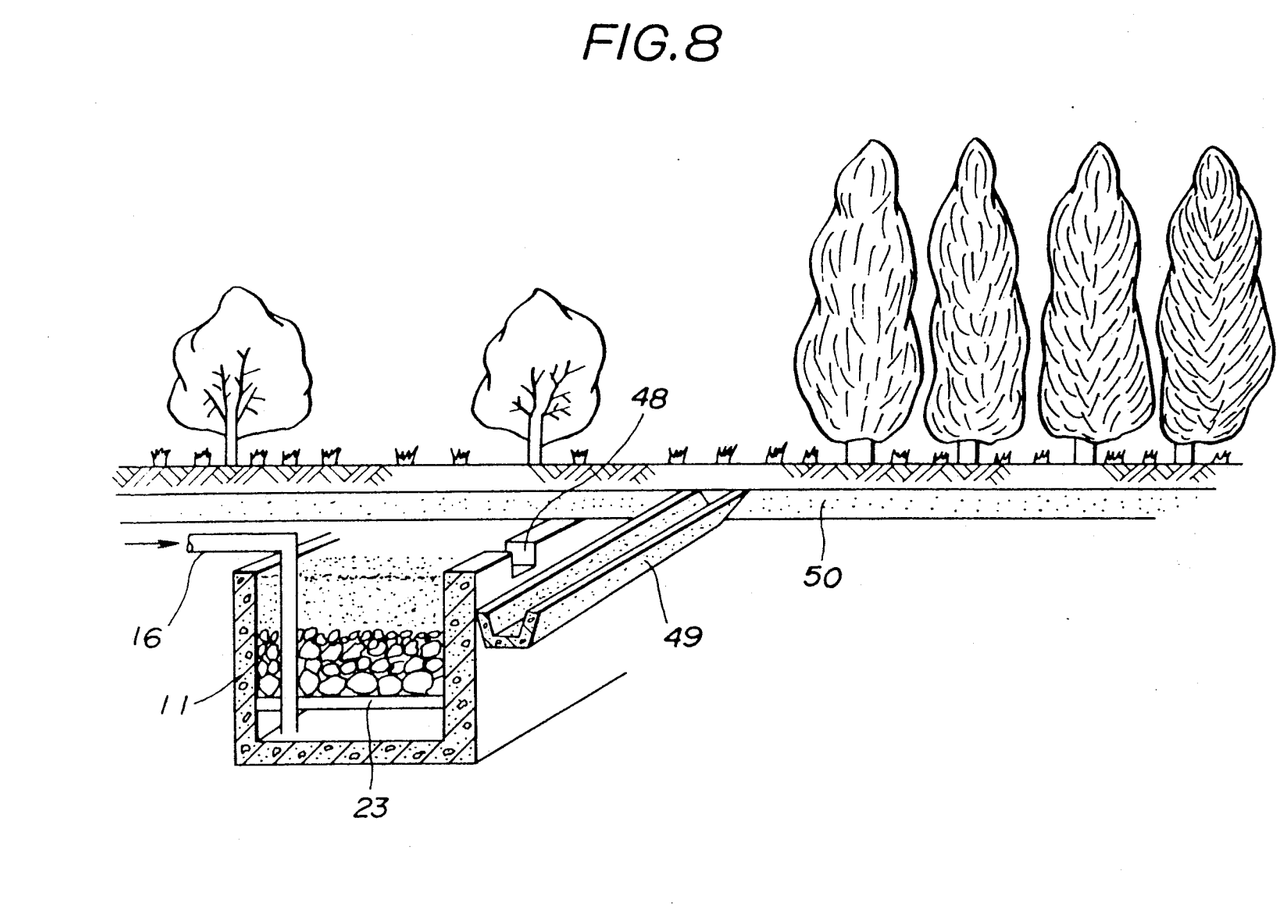

FIG. 8 shows a still another embodiment of the present invention which shows an example in which a concave overflow groove 48 is formed in the upper end of the side wall of the treating vessel 11, and U-shaped groove 49 for receiving overflow water from the overflow groove 48 is juxtaposed in the treating vessel 11, and the U-shaped groove 49 is connected to a water pipe 50. According to this embodiment, when the treated water moved upwardly while being purified reaches the top of the treating vessel 11, the treated water passes through the U-shaped groove 49 from the overflow groove 48, and the water is guided from the water pipe 50 to an area where plants are distributed for effective use.

Figure 9:
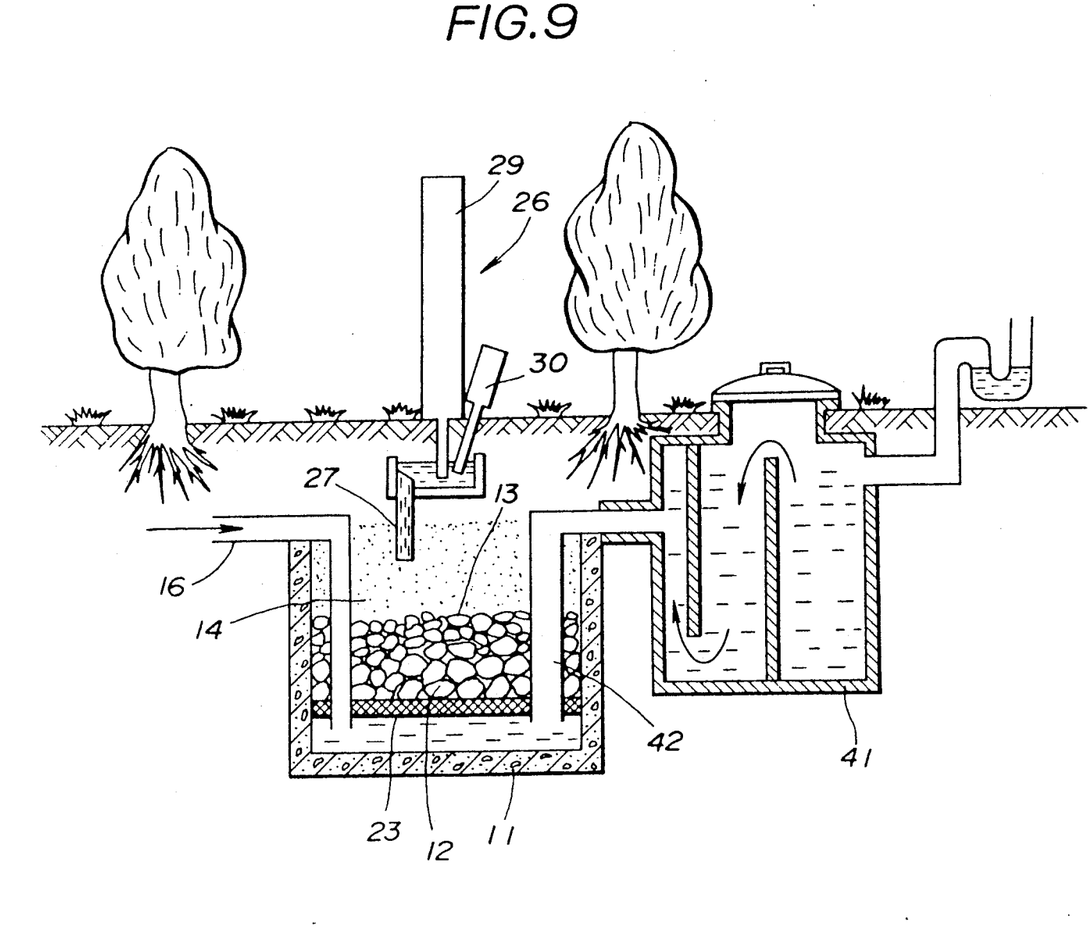

FIG. 9 shows another embodiment showing an example in which the treating vessel 11 of the present invention is connected to a handy purifier 41 by means of a pipe 42. According to this embodiment, the living miscellaneous wastewater introduced through the wastewater introducing pipe 16 and the sediment primarily purified by the handy purifier 41 and introduced by the pipe 42 are purified together within the treating vessel 11.

As described above, according to the present invention, the treated water is moved upwardly to the evaporation and emanation panel by the capillarity and emanated into the atmosphere. Therefore, it is possible to prevent the evaporation and emanation type living wastewater treating power in the winter season from being lowered which has been impossible to impart a uniform evaporation and emanation power during the year. In case where the treated water emits odors, an anti-odor agent can be dropped to thereby prevent the odor form being diffused into the atmosphere.

What is claimed is:

1. An evaporation and emanation type wastewater treating apparatus comprising a treating vessel for treating wastewater, a sludge separating sediment layer including gravel for separating sludge filled into said treating vessel, a wastewater introducing pipe for introducing wastewater into said treating vessel, and a capillary suction type evaporation and emanation unit for evaporating and emanating the treated water into the atmosphere, said capillary suction type evaporation and emanation unit comprising a siphon type capillary suction pipe to draw up the treated water from the treating vessel, a reservoir to accommodate the water drawn up by the pipe, and an evaporation and emanation panel means connected to said reservoir by a siphon pipe to draw up the water from said reservoir and evaporate and emanate the water.

2. The evaporation and emanation type wastewater treating apparatus of claim 1, the evaporation and emanation unit further including a deodorizing agent adding means for adding agent into the reservoir to help prevent diffusion of odor into the surroundings.

3. The evaporation and emanation type wastewater treating apparatus of claim 1, the treating vessel further including an overflow portion formed in the upper end of said wastewater treating vessel, and a water flow passage for receiving overflow water from the overflow portion to carry the water to a side for use of the overflow water.

4. An evaporation and emanation type wastewater treating apparatus of claim 1, wherein the siphon type capillary suction pipe is formed by fibers of macromolecular material combined in form of a bundle.

5. An evaporation and emanation type wastewater treating apparatus of claim 1, wherein water-absorbing substance is contained in the reservoir so as to absorb the water drawn up by capillary effect.

6. An evaporation and emanation type wastewater treating apparatus of claim 1, wherein the evaporation and emanation panel includes an evaporation plate mounted on a siphon type capillary suction pipe.

7. An evaporation and emanation type wastewater treating apparatus of claim 1, wherein a solar battery operated blower is positioned adjacent to the evaporation panel.

8. An evaporation and emanation type wastewater treating apparatus of claim 1, wherein a heater is disposed on the evaporation panel.

9. An evaportion and emanation type wastewater treating system comprising a treating apparatus including a treating vessel for treating living miscellaneous waste water, a sludge separating sediment layer including gravel for separating sludge filled into said treating vessel, a capillary suction type evaporation and emanation unit for evaporating and emanating treated water from the treating vessel into the atmosphere, said capillary suction type evaporation and emanation unit comprising a siphon type capillary suction pipe to draw up the treated water from the treating vessel, a reservoir to accommodate the water drawn up by the pipe, and an evaporation and emanation panel means connected to said reservoir by a siphon pipe to draw up the water from said reservoir and evaporate and emanate the water and a purifier vessel communicating with the treating vessel for primarily purifying sediment, the living miscellaneous wastewater and the primarily purified sediment being purified together in the treating vessel.

10. An evaporation and emanation type wastewater treating apparatus of claim 9, wherein the siphon type capillary suction pipe is formed by fibers of macromolecular material combined in form of a bundle.

11. An evaporation and emanation type wastewater treating apparatus of claim 9, wherein the evaporation and emanation panel includes an evaporation plate mounted on a siphon type capillary suction pipe.

12. An evaporation and emanation type wastewater treating apparatus of claim 9, wherein a solar battery operated blower is positioned adjacent to the evaporation panel.

13. An evaporation and emanation type wastewater treating apparatus of claim 9, wherein a heater is disposed on the evaporation panel.

* * * * *